Figure 1:
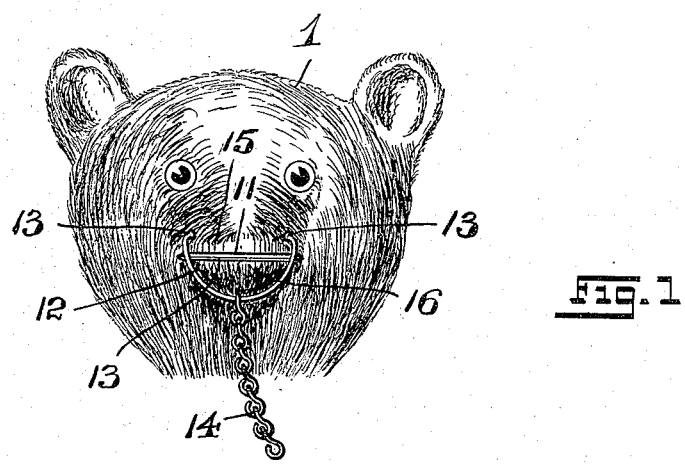

S. H. ROSOFSKY.
TOY.
APPLICATION FILED NOV. 26, 1915.

1,176,405.

Patented Mar. 21, 1916.

WITNESSES:
Fredk. H. W. Fraentzel
Eva E. Desch

INVENTOR:
Samuel H. Rosofsky,
BY
Fraentzel and Richards,
ATTORNEYS

UNITED STATES PATENT OFFICE.

SAMUEL H. ROSOFSKY, OF PORT RICHMOND, NEW YORK, ASSIGNOR OF ONE-THIRD TO HARRY GREENGLASS AND ONE-THIRD TO MICHAEL MAISEL, BOTH OF NEW YORK, N. Y.

TOY.

1,176,405.  Specification of Letters Patent.  Patented Mar. 21, 1916.

Application filed November 26, 1915. Serial No. 63,377.

*To all whom it may concern:*

Be it known that I, SAMUEL H. ROSOFSKY, a citizen of the United States, residing at Port Richmond, in the county of Richmond and State of New York, have invented certain new and useful Improvements in Toys; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention has reference, generally, to improvements in toys; and the present invention relates, more particularly, to an improved toy in the form of an animal having articulating jaws, and provided with a means for normally retaining the jaws in their closed relation, but permitting the mouth of the animal to open automatically, as soon as such jaw-engaging means is released from its retaining engagement with the said jaws.

My present invention, therefore, has for its principal object to provide a toy, in the form of a bear, or other animal, having articulating jaws, normally closed by a simply constructed and easily operated muzzling or retaining means, which can be readily withdrawn from its retaining engagement with the said articulating jaws, the means for actuating the said jaws being of such construction, so that the jaws are automatically operated to bring the mouth of the toy-animal into its opened condition.

The invention has for its further object to provide a means for retaining the articulating jaws of a toy-animal in closed relation, such means being in the form of a pivoted ring-like element, suitably applied to the snout or nose-portion of the animal and adapted to be readily swung into muzzling or retaining engagement with the two movable jaw-members so as to keep the mouth of the animal closed, until the said ring-like element is again brought into its released or disengaged relation with the said jaw-members.

Other objects of the present invention not at this time more particularly enumerated will be clearly understood from the following detailed description of the present invention.

With the various objects of the present invention in view, the said invention consists, primarily, in the novel toy hereinafter set forth; and, the invention consists, furthermore, in the novel arrangements and combinations of the several devices and parts, all of which will be described in detail in the following specification, and then finally embodied in the clauses of the claims which are appended to and which form an essential part of the said specification.

The invention is illustrated in the accompanying drawings, in which:—

Figure 2:
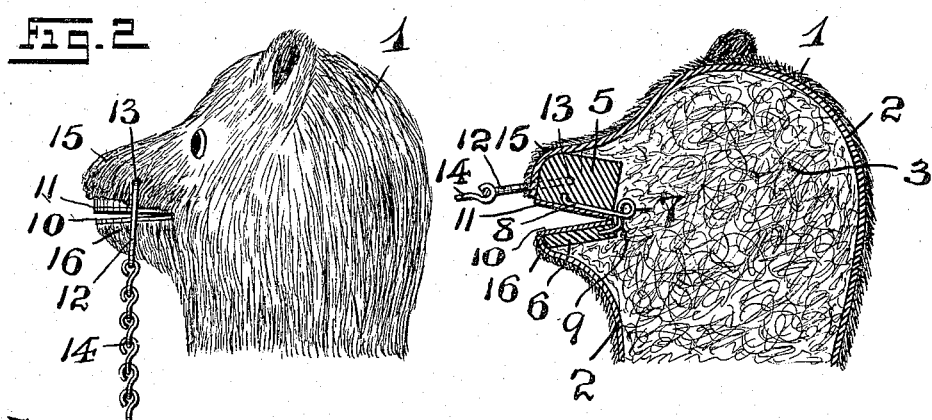
Figures 4, 5:
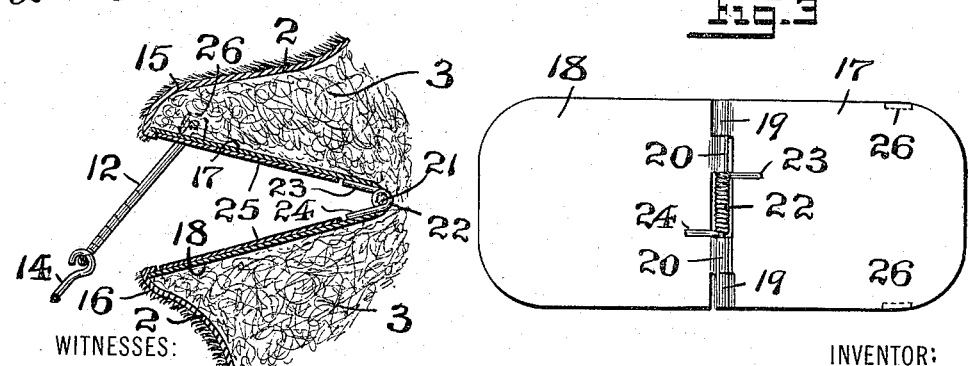

Figure 1 is a front view and Fig. 2 is a side elevation of the head-portion of a toy-animal, provided with articulating jaws and a muzzling means made according to and embodying the principles of the present invention. Fig. 3 is a vertical sectional representation of the said head-portion, illustrating the muzzling means in its disengaged relation with the movable-jaws, the latter being shown in their separated or articulated positions. Fig. 4 is a longitudinal vertical sectional representation of a part of the head-portion of a toy-animal provided with a slightly different jaw-articulating means from that represented in Fig. 3; and Fig. 5 is a plan view of the form of jaw-articulating means represented in said Fig. 4.

Similar characters of reference are employed in the said above described views, to indicate corresponding parts.

Referring now to the said drawings, the reference-character 1 indicates the head-portion of any suitable toy-animal, the same in the present instance comprising the usual covering 2, suitably stuffed with excelsior, as at 3, or with any other suitable material. Suitably mounted within the mouth-portion 4 of the said head are a pair of jaw-members 5 and 6, the said members being pivotally connected at their rear edges, by means of a coiled spring, as 7, having free end-portions, as 8 and 9, which are respectively attached in any suitable manner to the respective jaw-members 5 and 6. Cover-members 10 and 11 of suitably colored paper, or other suitable material, may be suitably secured upon the exposed surface-portions of the said jaw-members 5 and 6, as will be clearly evident from an inspection of said Fig. 3 of the drawings. The purpose of the said spring 7 is to provide a forced-apart relation of the said two jaw-members, so as to provide a snout or mouth-portion which will automatically open in the manner to be presently described. One means for retaining the articulating jaws thus provided in their closed relation is in the form of a ring-shaped element or member, as 12, preferably of semi-circular configuration, substantially as shown in Fig. 1 of the drawings, and provided with the free and angularly disposed end-portions, as 13, which pierce the covering 2 and are suitably and pivotally mounted in the opposite edge-portions of the jaw-member 5. Suitably mounted upon the main curved body-portion of the said element or member 12 is a flexible member 14, in the form of a chain or the like. To bring the separated or open jaws of the head-portion from their open relation indicated in said Fig. 3 of the drawings to their closed relation represented in said Figs. 1 and 2, all that is necessary is to pull upon the flexible member or chain 14 in a downward direction, whereby the flexible nose-portion 15 of the head will be moved toward the lower mouth-portion 16 of the said head, and the main loop-shaped part of the member or element 12 is swung beneath and into embraced relation with the said mouth-portion 16, so that the mouth of the toy is positively held closed, as will be clearly understood. When the flexible member or chain 14 is pulled in the direction of the arrow x, see Fig. 2 of the drawings, the said ring-shaped element or member 12 is readily brought into its disengaged relation with the said lower mouth-portion 16, thus permitting the spring 7 to exert its power, so as to cause the two jaw-members 5 and 6, to assume the separated relation indicated in Fig. 3, and then automatically open the mouth of the toy-animal, as will be clearly evident.

In the modification shown in Figs. 4 and 5 of the drawings, in lieu of the jaw-members 5 and 6, which may be made of wood, sole leather, or the like, two jaw-members 17 and 18 made of sheet-metal may be employed, these members being respectively provided with pivot-ears or lugs, as 19 and 20, pivotally connected by means of a pin or stem, as 21. Encircling a portion of said pin or stem 21 is a coiled spring 22, having its respective end-portions 23 and 24 bearing directly upon the respective sheet-metal plates or members 17 and 18, substantially as shown. The said hinged or articulated plates or members 17 and 18 thus connected and spring-actuated are suitably folded upon each other and suitably secured in the mouth-portion of the head, substantially as indicated in said Fig. 4 of the drawings. The said plates or members 17 and 18 may also be provided with colored coverings, as 25, in the form of paint, paper, or other suitable material. The means for retaining the articulating jaws of the head, shown in said Fig. 4, in their closed relation is the same as that employed with the construction of jaw-members described in connection with Figs. 1, 2 and 3 of the drawings, and is in the form of a ring-shaped element or member 12, having its end-portions 13 suitably and pivotally connected with the flexible nose-portion 15 of the head. If desired, the said plate or member 17 may be provided at or near its marginal edges with upwardly extending and suitably perforated ears or lugs, as 26, and as indicated in dotted outline in said Figs. 4 and 5, in the perforations of which the said end-portions 13 extend and are operatively arranged, as will be clearly understood.

I am aware, that some changes may be made in the general arrangements and combinations of the several devices and parts without departing from the scope of the present invention as set forth in the foregoing specification. Hence, I do not limit my invention to the exact arrangements and combinations of the devices and parts as described in the said specification, nor do I confine myself to the exact details of the construction of the said parts as illustrated in the accompanying drawings.

I claim:—

1. In a toy, a head having a mouth-portion adapted to be brought into opened and closed relation, articulating jaw-members within said mouth-portion, means pivotally connected with said head and coöperating with the said jaw-members for retaining the mouth closed, and means connected with said pivotal means for withdrawing the latter from its retaining engagement with said mouth-portion.

2. In a toy, a head having a mouth-portion adapted to be brought into open and closed relation, articulating jaw-members within said mouth-portion, a ring-shaped element pivotally connected with said head and coöperating with the said jaw-members for retaining the mouth closed, and a chain flexibly connected with said ring-shaped element for withdrawing the latter from its retaining engagement with said mouth-portion.

3. In a toy, a head having a mouth-portion adapted to be brought into opened and closed relation, articulating jaw-members within said mouth-portion, and a spring connected with said jaw-members, means pivotally connected with said head and coöperating with the said jaw-members for retaining the mouth closed, and means connected with said pivotal means for withdrawing the latter from its retaining engagement with said mouth-portion.

4. In a toy, a head having a mouth-portion adapted to be brought into opened and closed relation, articulating jaw-members within said mouth-portion, and a spring connected with said jaw-members, a ring-shaped element pivotally connected with said head and coöperating with the said jaw-members for retaining the mouth closed, and a chain flexibly connected with said ring-shaped element for withdrawing the latter from its retaining engagement with said mouth-portion.

In testimony, that I claim the invention set forth above I have hereunto set my hand this 22nd day of November, 1915.

SAMUEL H. ROSOFSKY.

Witnesses:
FRED'K C. FRAENTZEL,
FRED'K H. W. FRAENTZEL.